United States Patent
Iizuka et al.

(10) Patent No.: US 11,415,691 B2
(45) Date of Patent: Aug. 16, 2022

(54) ESTIMATION METHOD, ESTIMATION DEVICE, AND RECORDING MEDIUM

(71) Applicant: PANASONIC INTELLECTUAL PROPERTY MANAGEMENT CO., LTD., Osaka (JP)

(72) Inventors: Shoichi Iizuka, Osaka (JP); Takeshi Nakayama, Hyogo (JP); Naoki Honma, Iwate (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 369 days.

(21) Appl. No.: 16/708,789

(22) Filed: Dec. 10, 2019

(65) Prior Publication Data

US 2020/0209382 A1 Jul. 2, 2020

(30) Foreign Application Priority Data

Dec. 28, 2018 (JP) .............................. JP2018-247125
Aug. 26, 2019 (JP) .............................. JP2019-153348

(51) Int. Cl.
*G01S 13/72* (2006.01)
(52) U.S. Cl.
CPC .................................. *G01S 13/723* (2013.01)
(58) Field of Classification Search
None
See application file for complete search history.

(56) References Cited

U.S. PATENT DOCUMENTS

| | | |
|---|---|---|
| 2011/0240750 A1 | 10/2011 | Tokura |
| 2013/0335257 A1 | 12/2013 | Abrahamson |
| 2016/0025847 A1 | 1/2016 | Okuya et al. |
| 2020/0191943 A1* | 6/2020 | Wu ........................ G01S 13/726 |

FOREIGN PATENT DOCUMENTS

| | | |
|---|---|---|
| JP | 2008-275324 | 11/2008 |
| JP | 2011-215031 | 10/2011 |
| JP | 2014-512526 | 5/2014 |
| JP | 2015-059812 | 3/2015 |
| JP | 2015-117972 | 6/2015 |
| JP | 2017-117492 | 6/2017 |
| WO | 2012/125100 | 9/2012 |
| WO | 2014/141519 | 9/2014 |

* cited by examiner

*Primary Examiner* — Whitney Moore
(74) *Attorney, Agent, or Firm* — Greenblum & Bernstein, P.L.C.

(57) ABSTRACT

An estimation method for estimating target region information relating to a target region by using an estimation device that estimates information including a position of a living body by using a radio wave includes: acquiring first information relating to lengths of a planar shape of the target region; acquiring second information relating to an installation state of a transmission antenna and a reception antenna included in the estimation device; acquiring third information relating to a trajectory defined by a plurality of positions of the living body estimated by the estimation device when the living body moves along a predetermined path in the target region; and performing at least one of (1) estimation of the planar shape by correcting the first information and (2) estimation of the installation state by correcting the second information based on the first, second, and third information acquired, as the estimation of the target region information.

10 Claims, 15 Drawing Sheets

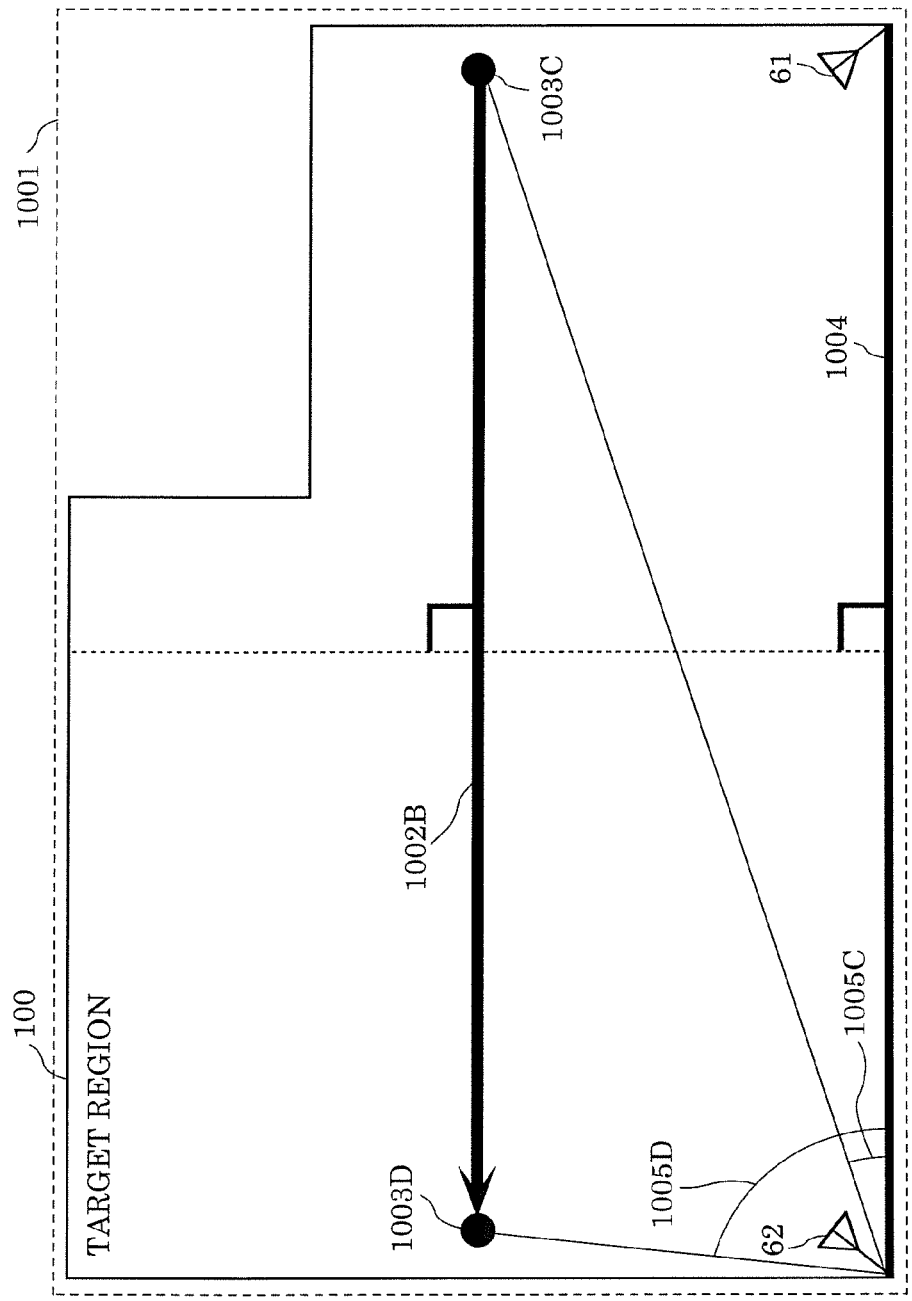

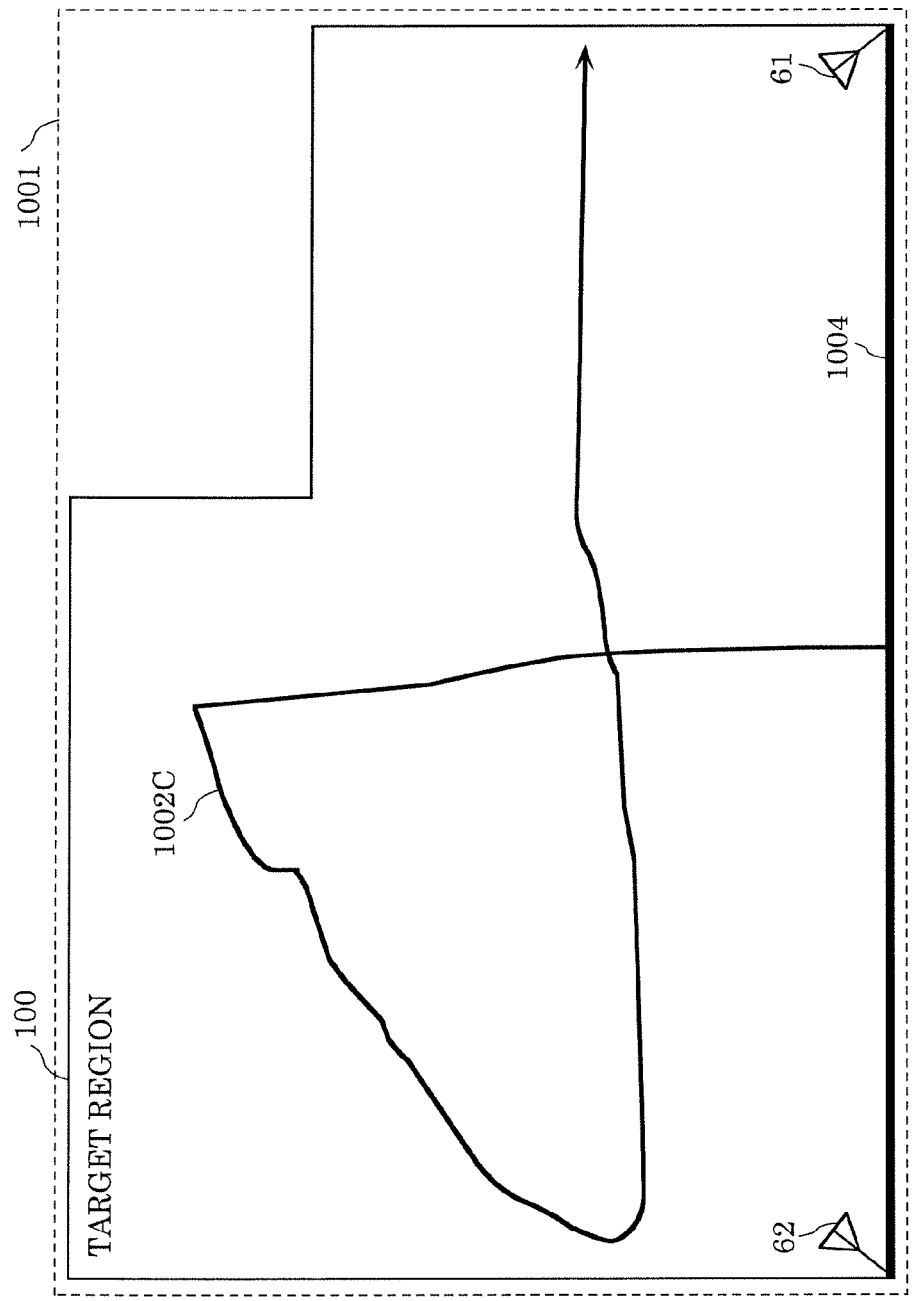

ESTIMATION METHOD, ESTIMATION DEVICE, AND RECORDING MEDIUM

CROSS REFERENCE TO RELATED APPLICATIONS

This application claims the benefit of priority of Japanese Patent Application Number 2018-247125 filed on Dec. 28, 2018, and Japanese Patent Application Number 2019-153348 filed on Aug. 26, 2019 the entire contents of which are hereby incorporated by reference.

BACKGROUND

1. Technical Field

The present disclosure relates to an estimation method, an estimation device, and a recording medium, and more particularly to an estimation method, an estimation device, and a recording medium that estimates a planar shape or the like of a target region by using a sensor or the like that estimates the position of a living body based on a wireless signal.

2. Description of the Related Art

Methods for estimating the position of a living body in a room, or a condition such as the orientation or action of the living body, by using a wireless signal are disclosed (see, for example, Japanese Unexamined Patent Application Publication (Translation of PCT Application) No. 2014-512526 (Patent Literature (PTL) 1), WO 2014/141519 (PTL 2), and Japanese Unexamined Patent Application Publication No. 2015-117972 (PTL 3)). For example, PTL 1 discloses a method for detecting a living body by using a Doppler sensor. PTL 2 discloses a method for detecting a human motion or living body information by using a Doppler sensor and a filter. PTL 3 discloses a method for determining the position or state of a person that is a detection target by analyzing a component including a Doppler shift by using a Fourier transformation.

SUMMARY

An estimation method according to one aspect of the present disclosure is an estimation method for estimating target region information relating to a target region by using an estimation device that estimates information including a position of a living body by using a radio wave, the estimation method including: acquiring first information relating to lengths of a planar shape of the target region; acquiring second information relating to an installation state of a transmission antenna and a reception antenna included in the estimation device; acquiring third information relating to a trajectory defined by a plurality of positions of the living body estimated by the estimation device when the living body moves along a predetermined path in the target region; and performing at least one of (1) estimation of the planar shape by correcting the first information and (2) estimation of the installation state by correcting the second information based on the first information, the second information, and the third information that were acquired, as the estimation of the target region information.

Generic or specific aspects of the present disclosure may be implemented by a device, a method, an integrated circuit, a computer program or a computer readable recording medium such as a CD-ROM, or may be implemented by any combination of a system, a method, an integrated circuit, a computer program, and a recording medium.

BRIEF DESCRIPTION OF DRAWINGS

These and other objects, advantages and features of the disclosure will become apparent from the following description thereof taken in conjunction with the accompanying drawings that illustrate a specific implementation of the present disclosure.

FIG. 9A is a schematic diagram showing another example of a path instructed in step S3 shown in FIG. 5 and a result of calculation performed in step S4;

FIG. 9B is a schematic diagram showing another example of a path instructed in step S3 shown in FIG. 5;

Figure 1:
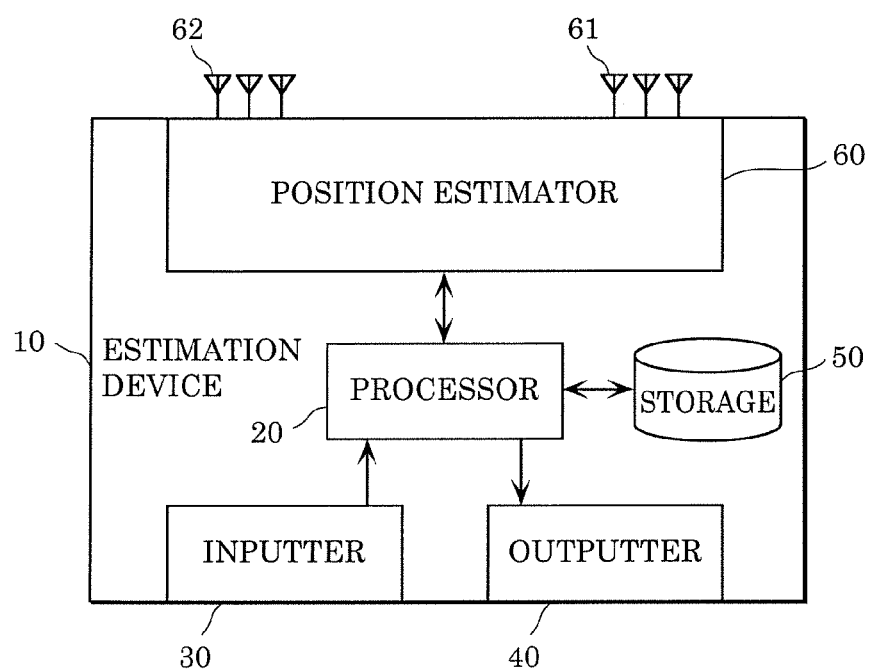
FIG. 1 is a block diagram showing an example of a configuration of an estimation device according to Embodiment 1.

DETAILED DESCRIPTION OF THE EMBODIMENT (Underlying Knowledge Forming the Basis of the Present Disclosure)

The inventors of the present disclosure conducted detailed studies on the conventional techniques disclosed in PTLs 1 to 3 described above, specifically, the methods for estimating the position of a living body in a room, or a condition such as the orientation or action of the living body, by using a wireless signal.

As a result, they found that, in order to estimate the position of a living body in a room or a condition of the living body by using the conventional techniques disclosed in PTLs 1 to 3, it is necessary to accurately input and store in advance the target region information of a target region that is a sensing target to be sensed by a device, or in other words, a sensor that can estimate the position and the like of a living body. As used herein, the target region information refers to information about the sensor position, the sensor orientation, the layout of the room that is the sensing target, and the like.

However, in the case where the shape of the room that is the sensing target is not square or rectangular, or in the case where there are many obstructions such as furniture in the room even if the room has a rectangular shape, it takes time to obtain the layout of the room accurately enough to graphically illustrate the room layout. For this reason, it is troublesome for the user of the sensor to accurately input the target region information such as the layout of the room.

Furthermore, they also found that, in the case where the sensor position or the sensor orientation that has been input as the target region information is incorrect, or in the case where the sensor position or the sensor orientation that has been input has a large error, the sensor cannot accurately estimate the position of the living body.

Meanwhile, for example, Japanese Unexamined Patent Application Publication No. 2011-215031 (PTL 4) discloses a device that estimates the presence or absence of a person, and the resting or activity condition of the person by using a Doppler sensor. However, the device disclosed in PTL 4 is problematic in that it is not possible to obtain a condition such as the position or orientation of the user.

As a method for obtaining the position or the like of a living body, a method that uses a device such as a vibration sensor or a camera may be used (see, for example, PTLs 5 and 6). For example, Japanese Unexamined Patent Application Publication No. 2015-59812 (PTL 5) discloses a device that estimates the position of a person by using a vibration sensor, and Japanese Unexamined Patent Application Publication No. 2008-275324 (PTL 6) discloses a device that estimates the position of a person and the position of an object by using a camera and an RF tag.

With the device disclosed in PTL 5, it is possible to estimate the position of a living body by using a vibration sensor, and also possible to estimate the self-position by tapping the sensor installation location. However, the device disclosed in PTL 5 is problematic in that it is necessary to manually input the outer shape of a room that is the sensing target.

Also, with the device disclosed in PTL 6, it is possible to estimate a movement of a person or luggage by using an electronic tag and a camera image. However, the device disclosed in PTL 6 has a problem of privacy because it is necessary to capture an image of the person or luggage.

As a result of the detailed studies on the problems described above, the inventors of the present disclosure found that information relating to the shape of a target region can be acquired or corrected by using the propagation properties of a reflection signal that is transmitted from a transmission antenna including an antenna element provided in the target region and that is reflected by a living body. In this way, the inventors have accomplished the present disclosure.

That is, an estimation method according to one aspect of the present disclosure is an estimation method for estimating target region information relating to a target region by using an estimation device that estimates information including a position of a living body by using a radio wave, the estimation method including: acquiring first information relating to lengths of a planar shape of the target region; acquiring second information relating to an installation state of a transmission antenna and a reception antenna included in the estimation device; acquiring third information relating to a trajectory defined by a plurality of positions of the living body estimated by the estimation device when the living body moves along a predetermined path in the target region; and performing at least one of (1) estimation of the planar shape by correcting the first information and (2) estimation of the installation state by correcting the second information based on the first information, the second information, and the third information that were acquired, as the estimation of the target region information.

With this configuration, the target region information can be estimated with ease and with high accuracy by using a wireless signal. More specifically, with the use of a wireless signal, for example, the planar shape such as the outer shape of the target region or the installation state such as the installation position can be estimated with ease and with high accuracy as target region information relating to the target region in which the living body is to be sensed.

Here, for example, the predetermined path is a path that passes through a center of the target region and along which the living body moves in the target region, and when performing at least one of the estimation of the planar shape and the estimation of the installation state, the estimation of the installation state including installation positions of the transmission antenna and the reception antenna is performed by correcting the second information based on the first information, the second information, and the third information that were acquired, as the estimation of the target region information.

Also, for example, the predetermined path is a path extending along an outer circumference of the target region in which the living body is capable of moving, and when performing at least one of the estimation of the planar shape and the estimation of the installation state, the estimation of the planar shape is performed by correcting the first information based on the first information, the second information, and the third information that were acquired, as the estimation of the target region information.

Also, for example, the installation state may include at least one of installation positions, installation heights, and installation angles of the transmission antenna and the reception antenna.

Also, for example, the target region may include one or more indoor rooms, and the estimation method may further include: acquiring fourth information indicating the position of the living body estimated by the estimation device when the living body stops at a position of a fixture installed in the target region; and associating the fourth information with identification information identifying the fixture or a room in which the fixture is installed from among the one or more indoor rooms, and storing the fourth information and the identification information in a storage.

Also, for example, the estimation method may further include: displaying the fourth information on a display device as information indicating the position of the fixture or a position of the room in which the fixture is installed; receiving correction information for correcting the position of the fixture or the position of the room input by a user; and correcting the fourth information based on the correction information received.

Also, for example, the estimation method may further include: acquiring the position of the living body estimated by the estimation device when the living body stops at a position in a direction toward a predetermined azimuth as viewed from a center of the target region; associating a direction from the center toward the position of the living body acquired with the predetermined azimuth; and storing the direction and the predetermined azimuth in a storage as an azimuth of the target region.

Here, for example, the estimation device estimates the position of the living body based on signal components affected by the living body, the signal components being extracted from among signals received by the reception antenna by using a predetermined method.

Also, an estimation device according to one aspect of the present disclosure is an estimation device that estimates target region information relating to a target region by using a position estimator that includes a transmission antenna and a reception antenna and estimates information including a position of a living body by using a radio wave, the estimation device including: an acquirer that acquires first information relating to lengths of a planar shape of the target region, acquires second information relating to an installation state of the transmission antenna and the reception antenna, and acquires third information relating to a trajectory defined by a plurality of positions of the living body estimated by the position estimator when the living body moves along a predetermined path in the target region; and a correction estimator that performs at least one of (1) estimation of the planar shape by correcting the first information and (2) estimation of the installation state by correcting the second information based on the first information, the second information, and the third information that were acquired, as the estimation of the target region information.

Also, a recording medium according to one aspect of the present disclosure is a non-transitory computer-readable recording medium having a program recorded thereon for causing a computer to execute an estimation method for estimating target region information relating to a target region by using an estimation device that estimates information including a position of a living body by using a radio wave, the estimation method including: acquiring first information relating to lengths of a planar shape of the target region; acquiring second information relating to an installation state of a transmission antenna and a reception antenna included in the estimation device; acquiring third information relating to a trajectory defined by a plurality of positions of the living body estimated by the estimation device when the living body moves along a predetermined path in the target region; and performing at least one of (1) estimation of the planar shape by correcting the first information and (2) estimation of the installation state by correcting the second information based on the first information, the second information, and the third information that were acquired, as the estimation of the target region information.

The present disclosure can be implemented not only as a device, but also as an integrated circuit that includes a processing means of the device, or as a method that includes steps performed by the processing means of the device, or as a program that causes a computer to execute the steps, or as information, data or a signal that indicates the program. The program, the information, the data and the signal may be distributed via a recording medium such as a CD-ROM, or a communication medium such as the Internet.

Hereinafter, an embodiment according to the present disclosure will be described in detail with reference to the drawings. The embodiment described below shows a preferred specific example of the present disclosure. The numerical values, shapes, materials, structural elements, the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements that form a more preferred embodiment. In the specification and drawings of the present application, structural elements that have substantially the same function and configuration are given the same reference numerals, and a redundant description will be omitted.

Embodiment 1

Hereinafter, an estimation method performed by estimation device 10 according to Embodiment 1 and the like will be described with reference to the drawings.

[Configuration of Estimation Device 10]

Figure 2:
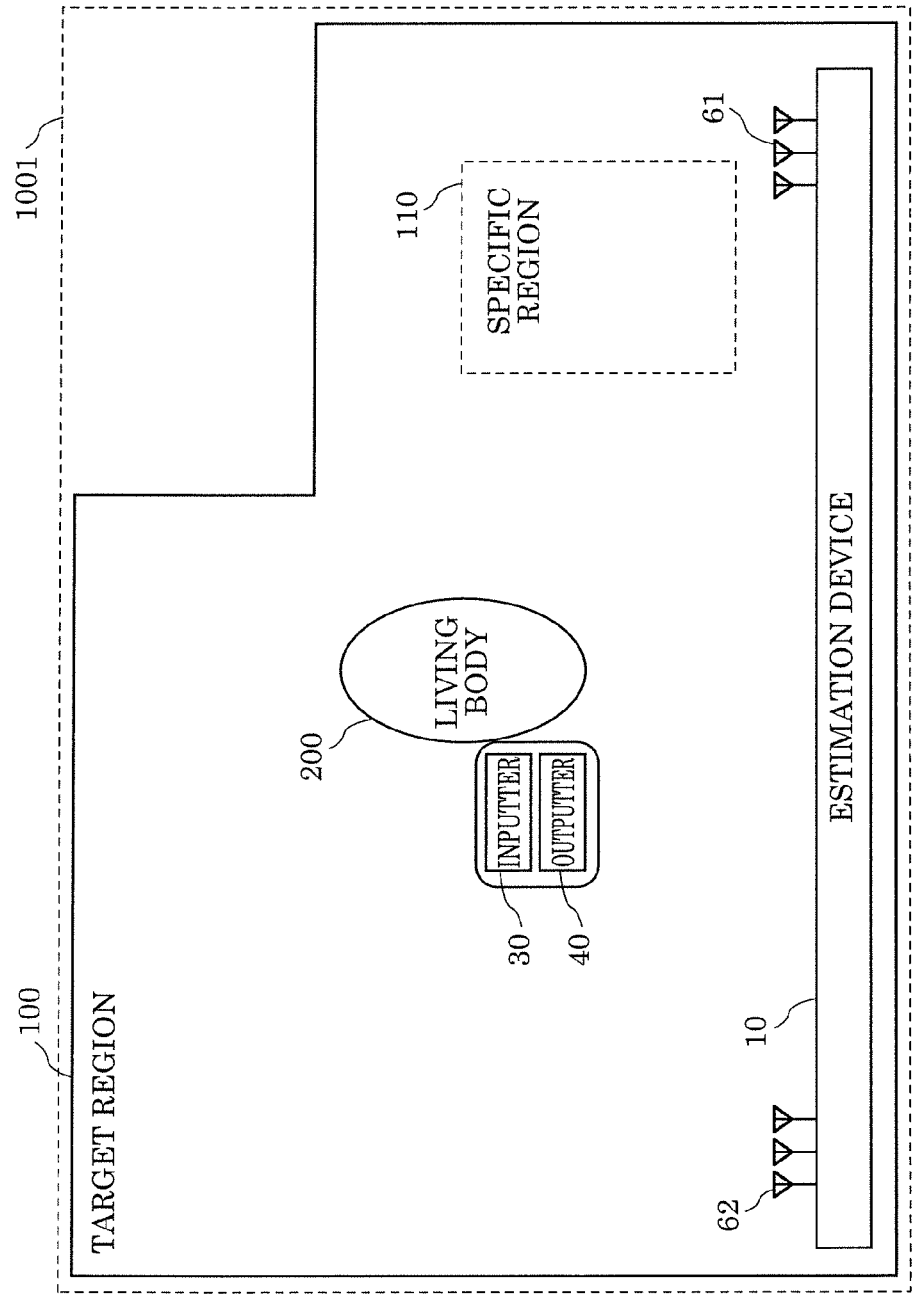
FIG. 2 is a schematic diagram conceptually showing a space in which the estimation device according to Embodiment 1 is provided.

FIG. 1 is a block diagram showing an example of a configuration of estimation device 10 according to Embodiment 1. FIG. 2 is a schematic diagram conceptually showing a space in which estimation device 10 according to Embodiment 1 is provided.

Estimation device 10 shown in FIG. 1 includes processor 20, inputter 30, outputter 40, storage 50, and position estimator 60 that includes transmission antenna 61 and reception antenna 62. Estimation device 10 estimates target region information that is information relating to target region 100. Here, target region 100 is a space that is a sensing target to be sensed by estimation device 10, and may be, for example, a room as shown in FIG. 2 in which estimation device 10 is installed. Target region 100 maybe composed of one or more indoor rooms. Although a detailed description of the target region information of target region 100 will be given later, the target region information of target region 100 may include, for example, the planar shape (outer shape) of target region 100, or may include the installation state of transmission antenna 61 and reception antenna 62 installed in target region 100. Hereinafter, a detailed configuration of estimation device 10 will be described.

[Inputter 30]

Inputter 30 receives an input of first information relating to the lengths of the planar shape of target region 100, and transmits the input first information to processor 20. Also, inputter 30 receives an input of second information relating to the installation state of transmission antenna 61 and reception antenna 62, and transmits the input second information to processor 20. In the present embodiment, as the first information relating to the lengths of the planar shape of target region 100, first information indicating the vertical length and horizontal length of rectangular shape 1001 shown in FIG. 2 is initially input into inputter 30. Also, inputter 30 receives an input of at least one of the positions, the heights, and the angles at which transmission antenna 61 and reception antenna 62 are installed (hereinafter referred to as installation positions, installation heights, and installation angles), as the second information relating to the installation state of transmission antenna 61 and reception antenna 62.

Inputter 30 includes an interface for transmitting, to processor 20, information including the first information and the second information that have been input. Inputter 30 may include an interface, such as, for example, a keyboard or a touch pad, that is operated directly by the user of estimation device 10 and into which information is input. Alternatively, inputter 30 may include an interface that connects to another electronic device or a communication medium such as the Internet and receives information (in other words, receives an input of information).

Also, inputter 30 may be a device that reads out information that has already been recorded in a recording medium and transmits the read information to processor 20.

Inputter 30 may be provided at the same position as processor 20 and position estimator 60 that are included in estimation device 10, or may be provided at a different position away from processor 20 and position estimator 60 that are included in estimation device 10 as shown in FIG. 2. In other words, inputter 30 may be physically combined unitarily with estimation device 10, or may be provided at a position different from the position where estimation device 10 is provided. In the case where inputter 30 is provided at a position different from the position where processor 20 and position estimator 60 are provided, inputter 30 remotely transmits input information to processor 20.

[Outputter 40]

Outputter 40 includes an interface for outputting information indicating a result of processing performed by processor 20 or instruction information for the user. Here, the user is an example of living body 200 shown in FIG. 2, and the user is present within target region 100 and operates estimation device 10.

Outputter 40 may include an interface for presenting information directly to the user, such as, for example, a display or a speaker, or may include an interface for connecting to another electronic device or a communication medium such as the Internet and outputting information.

Outputter 40 may be a unitary device combined with inputter 30, such as a smartphone or a computer. In other words, outputter 40 may be provided at the same position as processor 20 and position estimator 60 that are included in estimation device 10, or may be provided at a different position away from processor 20 and position estimator 60 that are included in estimation device 10 as shown in FIG. 2. In the case where outputter 40 is provided at a position different from the position where processor 20 and position estimator 60 are provided, outputter 40 remotely receives, from processor 20, information to be output.

In the present embodiment, outputter 40 outputs, as the instruction information for the user, information indicating an instruction to move along a predetermined path, or information indicating an instruction to stop at the position of a fixture installed in target region 100. As used herein, the predetermined path may be a path that passes through the center of target region 100 and along which living body 200 can move in target region 100, or may be a path that extends along the outer circumference of target region 100 and along which living body 200 can move in target region 100. Also, the fixture may be a piece of furniture placed in the room such as a bed or a chair, or may be a toilet, a kitchen, a washing machine, a bathtub, or the like.

Also, outputter 40 outputs, as the information indicating a result of processing performed by processor 20, information indicating an estimated planar shape of the target region, or information indicating an estimated installation state.

Outputter 40 may output information indicating an instruction to input first information, second information, and third information.

Also, outputter 40 may cause the information stored in storage 50 to be presented or displayed on a display device. For example, outputter 40 may cause fourth information indicating the position of living body 200 that corresponds to the position of the fixture to be displayed on outputter 40 or a display device, as information indicating the position of the fixture or the position of the room in which the fixture is installed. Then, upon receiving correction information for correcting the position of the fixture or the position of the room displayed, outputter 40 may transmit the received correction information to processor 20. The correction information is not necessarily received by outputter 40 or the display device, and may be received by inputter 30. Also, the correction information may be input by living body 200, or may be input by a user of estimation device 10 who is different from living body 200.

[Storage 50]

Storage 50 includes a non-volatile storage area (auxiliary storage device), and stores information used by estimation device 10 to perform various types of processing operations. Storage 50 may be, for example, a ROM (Read Only Memory), a flash memory, a HDD (Hard Disk Drive), or the like.

In the present embodiment, storage 50 stores first information relating to the lengths of the planar shape of the target region, second information relating to the installation state of transmission antenna 61 and reception antenna 62, third information relating to a trajectory defined by a plurality of positions of living body 200, and the like.

Also, storage 50 may store fourth information indicating the positon of living body 200 that corresponds to the position of the fixture and identification information identifying the fixture or the room in which the fixture is installed in association with each other. Also, storage 50 may store the azimuth of target region 100. In this case, storage 50 stores the azimuth of target region 100 by associating a direction in which living body 200 moves from the center of target region 100 toward a predetermined azimuth as viewed from the center of target region 100 with the predetermined azimuth.

Storage 50 may store a program that causes processor 20, inputter 30, outputter 40, and position estimator 60 to operate. Also, storage 50 is not necessarily included in estimation device 10, and may be included in a cloud or an external server device.

[Position Estimator 60]

Position estimator 60 estimates information including the position of living body 200 by using a radio wave, or in other words, a wireless signal. More specifically, position estimator 60 includes transmission antenna 61 and reception antenna 62 that are provided within target region 100, and estimates the position of living body 200 by using a wireless signal. Position estimator 60 may be, for example, a position estimation device that estimates the position of living body 200 by using a wireless signal, or may be a sensor that estimates the position of living body 200 by using a wireless signal.

Position estimator 60 estimates the position of living body 200 based on signal components affected by living body 200, the signal components being extracted from a signal received by reception antenna 62 by using a predetermined method. More specifically, position estimator 60 estimates the position of living body 200 that is the detection target by, for example, transmitting a radio wave (wireless signal) from transmission antenna 61 and analyzing a Doppler shift component included in a reflected wave received by reception antenna 62, as disclosed in PTL 3.

In the present embodiment, as shown in FIG. 2, transmission antenna 61 and reception antenna 62 are provided at the opposing ends of one side of target region 100 such as side 1004. Position estimator 60 is controlled by processor 20 so as to estimate a plurality of positions of living body 200 when living body 200 moves along a predetermined path in target region 100. Also, position estimator 60 is controlled by processor 20 so as to estimate the position of living body 200 when living body 200 stops at the position of the fixture installed in target region 100. Position estimator 60 may be controlled by processor 20 so as to estimate the position of living body 200 when living body 200 stops at specific region 110 in target region 100. Here, specific region 110 shown in FIG. 2 may be a room included in target region 100, or may be a region that is included in target region 100 and whose position or outer shape needs to be detected. For example, specific region 110 may be a region such as, for example, a toilet room or a bathroom, or may be a region that indicates furniture in a room such as a bed or a chair.

Also, position estimator 60 may be controlled by processor 20 so as to estimate the position of living body 200 when living body 200 stops at a position in a direction toward a predetermined azimuth as viewed from the center of target region 100. As used herein, the predetermined azimuth may be, for example, north that is one of the four points of the compass.

[Processor 20]

Processor 20 executes various types of processing operations for operating estimation device 10. Processor 20 includes, for example, a processing unit that executes a control program, and a volatile storage area (main storage device) that is used as a work area to execute the control program. The volatile storage area may be, for example, a RAM (Random Access Memory).

Processor 20 may be a dedicated circuit for performing various types of processing operations for operating estimation device 10. That is, processor 20 may be a circuit that performs software processing, or may be a circuit that performs hardware processing.

Figure 3:
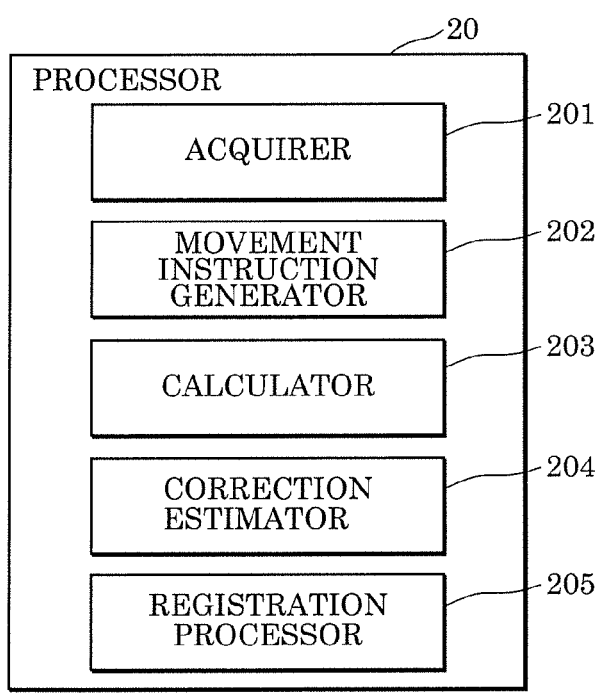
FIG. 3 is a block diagram showing an example of a detailed configuration of a processor according to Embodiment 1.

FIG. 3 is a block diagram showing an example of a detailed configuration of processor 20 according to Embodiment 1. Processor 20 shown in FIG. 2 includes acquirer 201, movement instruction generator 202, calculator 203, correction estimator 204, and registration processor 205. Hereinafter, the structural elements will be described in detail.

<Acquirer 201>

Acquirer 201 acquires, from inputter 30, the first information relating to the lengths of the planar shape of target region 100. In the example shown in FIG. 2, the lengths of the planar shape of rectangular shape 1001 are initially input because it is troublesome to input the accurate lengths of the planar shape of target region 100. That is, acquirer 201 acquires, from inputter 30, the first information relating to the vertical length and horizontal length of rectangular shape 1001 initially input into inputter 30.

Also, acquirer 201 acquires, from inputter 30, the second information relating to the installation state of transmission antenna 61 and reception antenna 62 of position estimator 60. In the example shown in FIG. 2, acquirer 201 acquires, from inputter 30, the second information relating to the installation state including at least one of the installation positions, the installation heights, and the installation angles of transmission antenna 61 and reception antenna 62, which were initially input into inputter 30.

Also, acquirer 201 acquires the third information relating to a trajectory defined by a plurality of positions of living body 200 estimated by position estimator 60 when living body 200 moves along a predetermined path in target region 100. As described above, the predetermined path may be a path that passes through the center of target region 100, or may be a path that extends along the outer circumference of target region 100 in which living body 200 can move.

Acquirer 201 may acquire the fourth information indicating the position of living body 200 estimated by position estimator 60 when living body 200 stops at the position of the fixture installed in target region 100. Also, acquirer 201 may acquire the position of living body 200 estimated by position estimator 60 when living body 200 stops at a position in a direction toward a predetermined azimuth as viewed from the center of target region 100.

<Movement Instruction Generator 202>

Movement instruction generator 202 generates information indicating an instruction to living body 200 to move along a predetermined path, or an instruction to living body 200 to move to a predetermined position and stop at the predetermined position.

In the present embodiment, movement instruction generator 202 generates information indicating an instruction to living body 200 to move along a predetermined path in target region 100, and transmits the generated information to outputter 40. Alternatively, movement instruction generator 202 may generate information indicating an instruction to stop at the position of the fixture installed in target region 100 or at specific region 110, and transmit the generated information to outputter 40. Alternatively, movement instruction generator 202 may generate information indicating an instruction to stop at a position in a direction toward a predetermined azimuth as viewed from the center of target region 100, and transmit the generated information to outputter 40.

<Calculator 203>

Calculator 203 calculates the lengths of the planar shape of target region 100 included in the first information.

In the present embodiment, calculator 203 calculates, for example, the length of side 1004 included in the first information based on the third information relating to the trajectory defined by a plurality of positions of living body 200 acquired by acquirer 201. Calculator 203 calculates the length of side 1004 again despite the fact that the first information relating to the vertical length and horizontal length of rectangular shape 1001 shown in FIG. 2 were initially input. This is because the lengths of rectangular shape 1001 initially input by living body 200 as the first information may contain a measurement error, or the installation positions of transmission antenna 61 and reception antenna 62 may contain a misalignment.

Calculator 203 may calculate the installation positions or installation angles of transmission antenna 61 and reception antenna 62 based on the third information relating to the trajectory defined by a plurality of positions of living body 200 acquired by acquirer 201.

<Correction Estimator 204>

Correction estimator 204 estimates target region information of target region 100 such as the planar shape (outer shape) of target region 100 or the installation state of transmission antenna 61 and reception antenna 62 installed in target region 100 based on the first information, the second information, and the third information acquired by acquirer 201. More specifically, correction estimator 204 performs at least one of the following operations as the estimation of the target region information of target region 100 based on the first information, the second information, and the third information: (1) estimation of the planar shape by correcting the first information; and (2) estimation of the installation state by correcting the second information.

For example, it is assumed that acquirer 201 acquires, as the predetermined path, the third information relating to the trajectory defined by a plurality of positions of living body 200 estimated by position estimator 60 when living body 200 moves along the path passing the center of target region 100 in target region 100. In this case, correction estimator 204 estimates the installation state of transmission antenna 61 and reception antenna 62 including the installation positions of transmission antenna 61 and reception antenna 62 by correcting the second information based on the first information, the second information, and the third information.

Alternatively, for example, it is assumed that acquirer 201 acquires, as the predetermined path, the third information relating to the trajectory defined by a plurality of positions of living body 200 estimated by position estimator 60 when living body 200 moves along the path extending along the outer circumference of target region 100 in which living body 200 can move. In this case, correction estimator 204 estimates the planar shape (outer shape) of target region 100 by correcting the first information based on the first information, the second information, and the third information.

In the present embodiment, correction estimator 204 may estimate the length of side 1004 on which transmission antenna 61 and reception antenna 62 are installed as shown in FIG. 2, or may estimate a region obtained by correcting the outer shape of rectangular shape 1001 initially input as the first information as the outer shape of target region 100.

More specifically, correction estimator 204 may estimate the length of side 1004 calculated by calculator 203 as the accurate length of side 1004, and correct the horizontal length of target region 100 initially input as the first information. Correction estimator 204 may correct the first information by replacing the horizontal length of target region 100 initially input as the first information with the length of side 1004 calculated by calculator 203.

Alternatively, correction estimator 204 may estimate the installation positions or installation angles of transmission antenna 61 and reception antenna 62 calculated by calculator 203 as more accurate installation positions or installation angles of transmission antenna 61 and reception antenna 62. Then, correction estimator 204 may correct the installation positions or installation angles of transmission antenna 61 and reception antenna 62 initially input as the second information to the installation positions or installation angles of transmission antenna 61 and reception antenna 62 calculated by calculator 203.

Also, correction estimator 204 may estimate, as the outer shape of target region 100, the trajectory defined by a plurality of positions of living body 200 when living body 200 moves along the path extending along the outer circumference of target region 100, which is indicated by the third information. In this case, correction estimator 204 may correct, by using the trajectory, the lengths of the planar shape of target region 100 initially input as the first information. For example, in the example shown in FIG. 2, correction estimator 204 may estimate, by using the trajectory, a region obtained by shortening the length of the right side and the length of the upper side of four sides of rectangular shape 1001 initially input as the first information, as the planar shape of target region 100.

<Registration Processor 205>

Registration processor 205 performs registration processing of registering the position of a fixture in target region 100 or the position of specific region 110 in target region 100. For example, registration processor 205 registers the position of the fixture by associating the fourth information indicating the position of living body 200 that corresponds to the position of the fixture with identification information identifying the fixture or a room in which the fixture is installed from among one or more rooms, and storing them in storage 50. That is, as a result of these information being associated with each other and stored in storage 50 as described above, registration processor 205 can register the fourth information indicating the position of living body 200 that corresponds to the position of the fixture as the information indicating the position of the fixture or the position of the room in which the fixture is installed.

The fourth information registered as the information indicating the position of the fixture or the position of the room in which the fixture is installed may be corrected by living body 200 or the user of estimation device 10 who is different from living body 200. In other words, in the case where correction information for correcting the position of the fixture or the position of the room is received by outputter 40 or the like, the fourth information may be corrected based on the received correction information.

Also, registration processor 205 may perform registration processing of registering the azimuth of target region 100. For example, it is assumed that acquirer 201 acquires the position of living body 200 estimated by position estimator 60 when living body 200 stops at a position in a direction toward a predetermined azimuth as viewed from the center of target region 100. In this case, registration processor 205 may register the azimuth of target region 100 by associating the direction from the center target region 100 toward the position of living body 200 with a predetermined azimuth, and storing them in storage 50 as the azimuth of target region 100.

[Operations Performed by Estimation Device 10, etc.]

A description will be given of processing operations for estimating the target region information of target region 100 performed by estimation device 10 configured as described above.

Figure 4:
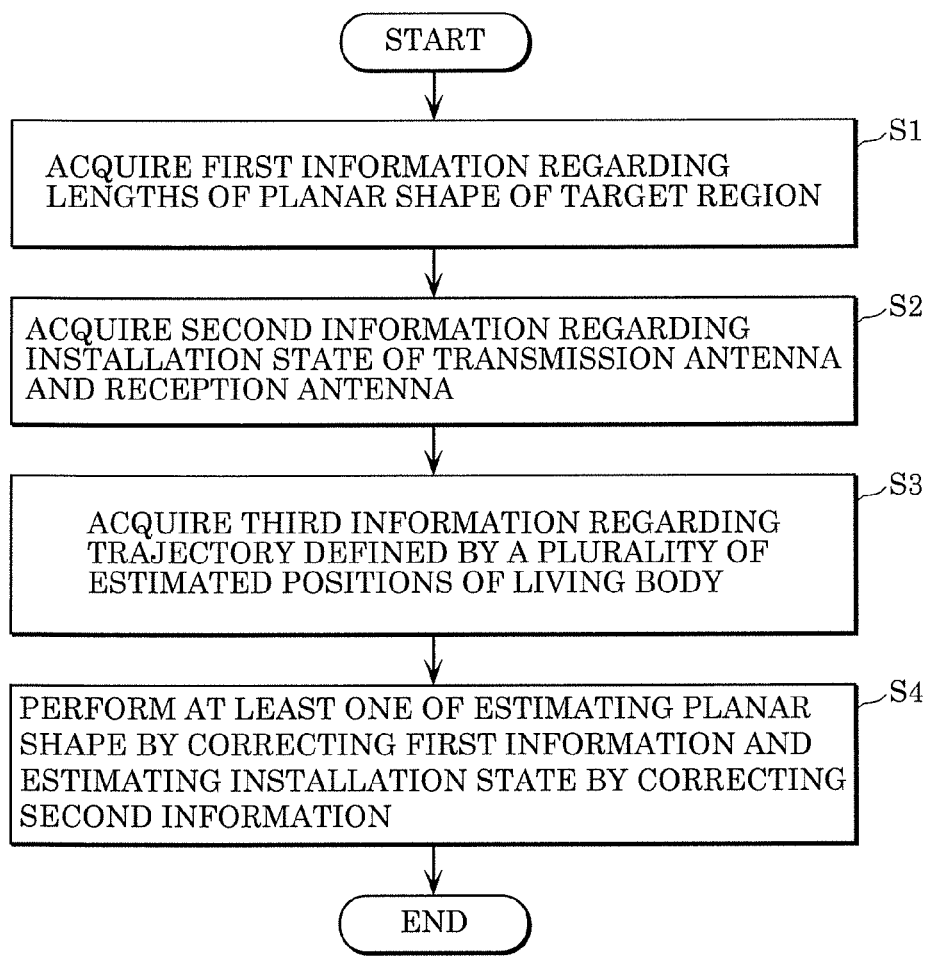
FIG. 4 is a flowchart illustrating overall processing performed by the estimation device according to Embodiment 1.

FIG. 4 is a flowchart illustrating overall processing performed by estimation device 10 according to Embodiment 1.

First as shown in FIG. 4, estimation device 10 acquires first information relating to the lengths of the planar shape of target region 100 (S1). Next, estimation device 10 acquires second information relating to the installation state of transmission antenna 61 and reception antenna 62 (S2). Next, estimation device 10 acquires third information relating to the trajectory defined by a plurality of positions of living body 200 estimated by position estimator 60 when living body 200 moves along a predetermined path in target region 100 (S3). Next, estimation device 10 performs at least one of: estimation of the planar shape of target region 100 by correcting the first information; and estimation of the installation state of transmission antenna 61 and reception antenna 62 by correcting the second information (S4). As described above, in step S4, estimation device 10 estimates the target region information of target region 100.

A specific implementation of steps S1 to S4 shown in FIG. 4 will be described below with reference to the drawings.

Figure 5:
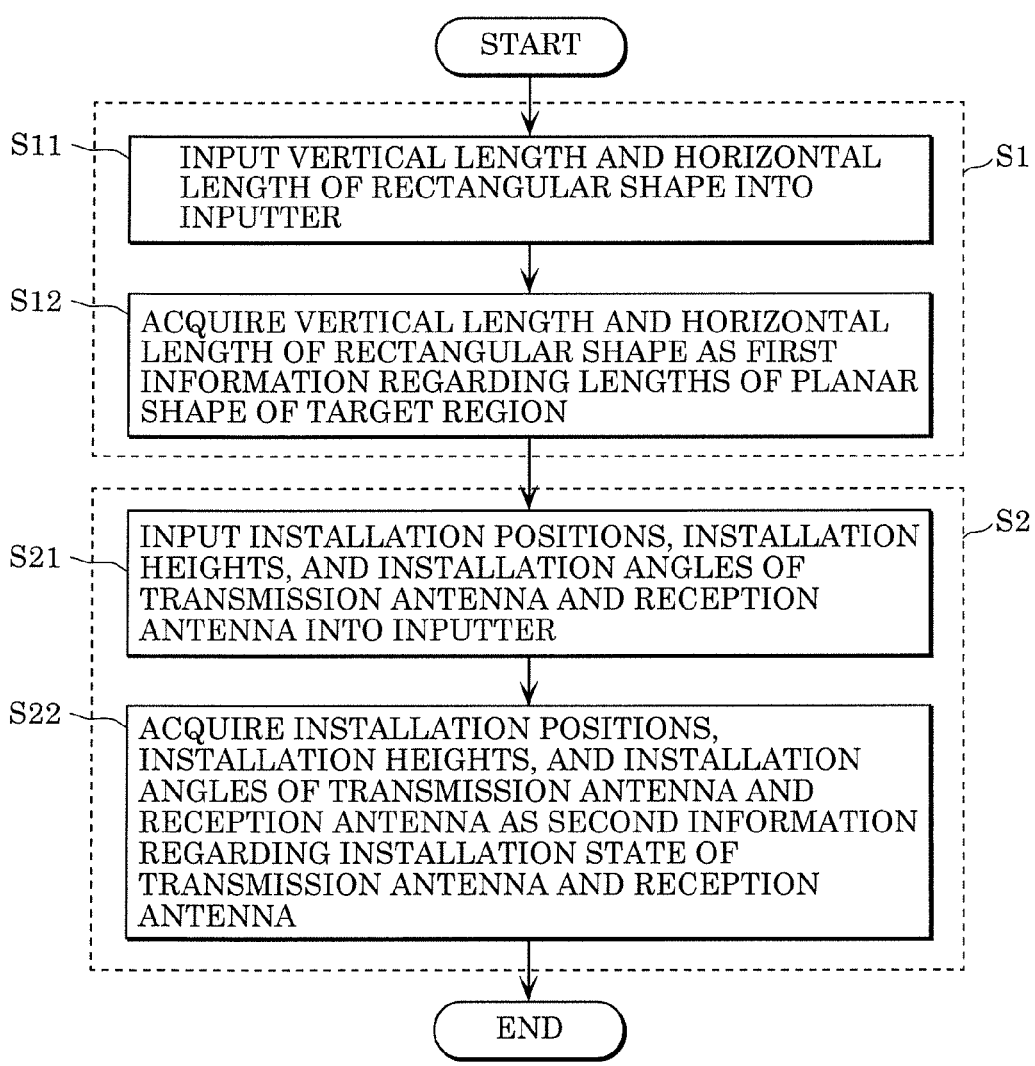
FIG. 5 is a flowchart illustrating a specific implementation of steps S1 and S2 shown in FIG. 4.
Figure 6:
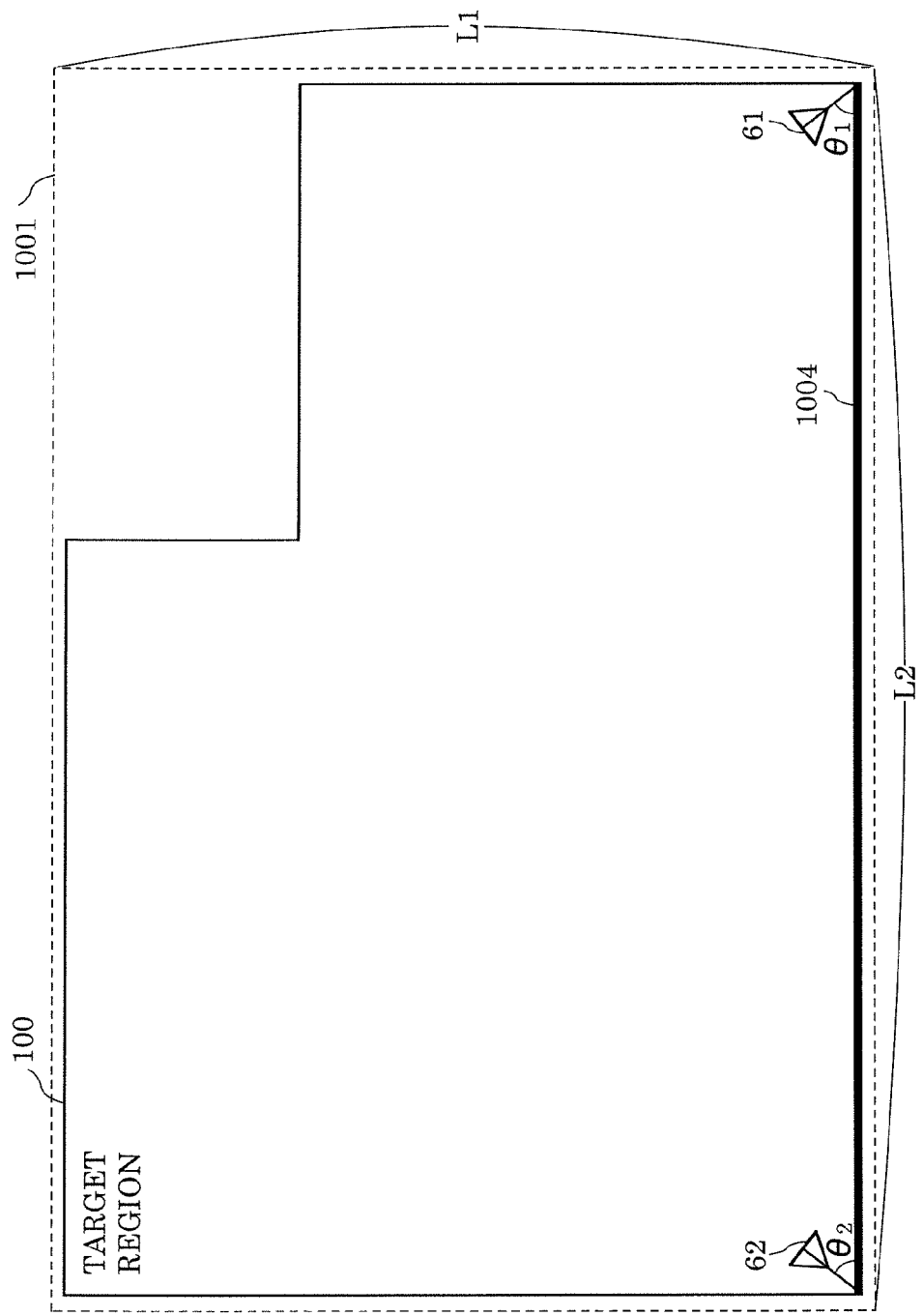
FIG. 6 is a schematic diagram showing an example of first information and second information that are initially input in steps S1 and S2 shown in FIG. 5.

FIG. 5 is a flowchart illustrating a specific implementation of steps S1 and S2 shown in FIG. 4. FIG. 6 is a schematic diagram showing an example of first information and second information that are initially input in steps S1 and S2 shown in FIG. 5. In FIG. 6, structural elements that are the same or similar to those shown in FIG. 2 are given the same reference numerals, and a detailed description thereof will be omitted.

In step S1, first, the user of estimation device 10 inputs, as initial input, the vertical length and horizontal length of rectangular shape 1001 including target region 100 into inputter 30 (S11). In the example shown in FIG. 6, the vertical length and horizontal length of rectangular shape 1001 are indicated by length L1 and length L2. Inputter 30 transmits, to processor 20, the vertical length and horizontal length of rectangular shape 1001 that have been input.

Outputter 40 may output, to the user, an instruction to initially input the first information relating to the lengths of the planar shape of target region 100. By doing so, the user can input the first information at an appropriate timing as the initial input.

Next, estimation device 10 acquires the vertical length and horizontal length of rectangular shape 1001 including target region 100 input in step S11, as the first information relating to the lengths of the planar shape of target region 100 (S12). More specifically, processor 20 acquires the vertical length and horizontal length of rectangular shape 1001 input in step S11, as the first information relating to the lengths of the planar shape of target region 100, and records the acquired first information in the volatile storage area (not shown) of processor 20 or storage 50.

Next, in step S2, the user of estimation device 10 inputs installation positions, the installation heights, and the installation angles of transmission antenna 61 and reception antenna 62 into inputter 30 (S21). FIG. 6 shows, as an example of installation angles of transmission antenna 61 and reception antenna 62, angle θ1 indicating the front direction of transmission antenna 61 and angle θ2 indicating the front direction of reception antenna 62. The installation positions of transmission antenna 61 and reception antenna 62 may be, for example, coordinates in target region 100, or the length of side 1004. Inputter 30 transmits, to processor 20, the installation positions, the installation heights, and the installation angles of transmission antenna 61 and reception antenna 62 that have been input. Outputter 40 may output, to the user, an instruction to initially input the second information relating to the installation state of transmission antenna 61 and reception antenna 62. By doing so, the user can input the second information at an appropriate timing as the initial input.

Next, estimation device 10 acquires the installation positions, the installation heights, and the installation angles of transmission antenna 61 and reception antenna 62 input in step S21, as the second information relating to the installation state of transmission antenna 61 and reception antenna 62 (S22). More specifically, processor 20 acquires the installation positions, the installation heights, and the installation angles of transmission antenna 61 and reception antenna 62 input in step S21, as the second information relating to the installation state of transmission antenna 61 and reception antenna 62, and records the information in the volatile storage area of processor 20 or storage 50.

Figure 7:
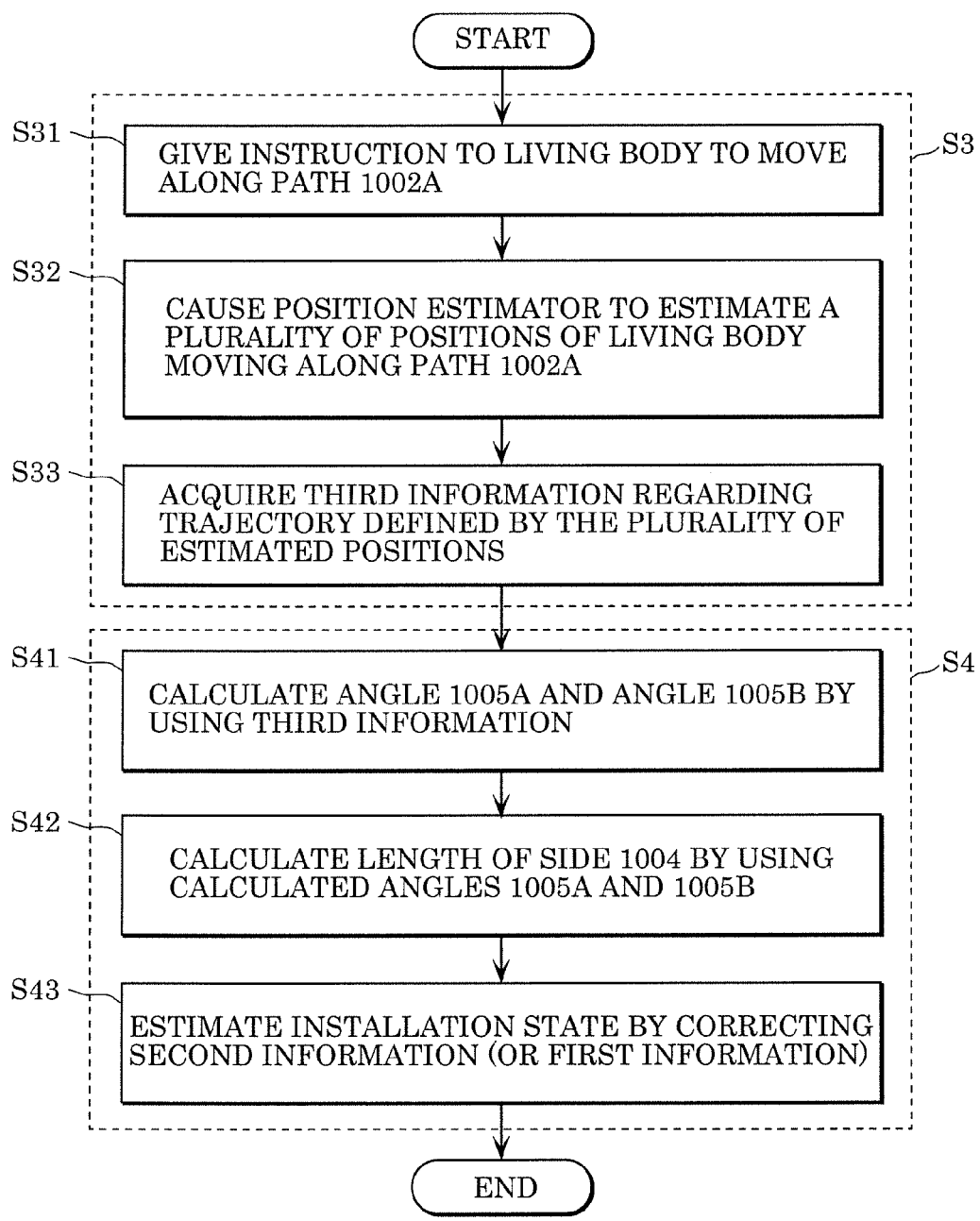
FIG. 7 is a flowchart illustrating a specific implementation of steps S3 and S4 shown in FIG. 4.

FIG. 7 is a flowchart illustrating a specific implementation of steps S3 and S4 shown in FIG. 4.

Figure 8:
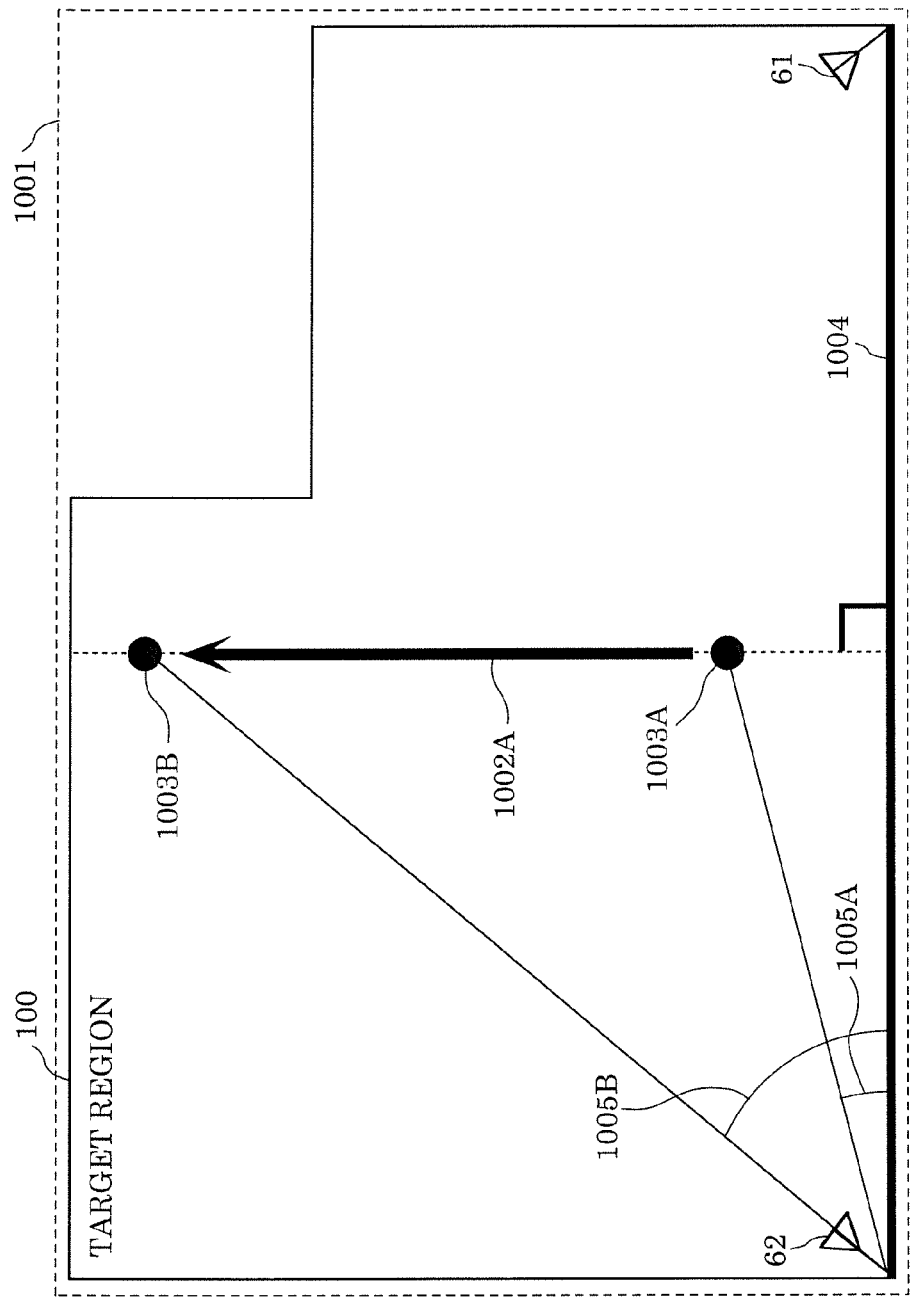
FIG. 8 is a schematic diagram showing an example of a path instructed in step S3 shown in FIG. 5 and a result of calculation performed in step S4.

FIG. 8 is a schematic diagram indicating an example of a path instructed in step S3 shown in FIG. 5 and a result of calculation performed in step S4. In FIG. 8, structural elements that are the same or similar to those shown in FIG. 2 are given the same reference numerals, and a detailed description thereof will be omitted.

In step S3, first, estimation device 10 gives an instruction to the user to move along path 1002A shown in FIG. 8 that is a predetermined path in target region 100 (S31). More specifically, processor 20 generates information indicating an instruction to move along path 1002A shown in FIG. 8, and transmits the generated information to outputter 40. By doing so, outputter 40 can instruct living body 200 that is the user to move along path 1002A shown in FIG. 8.

Here, path 1002A shown in FIG. 8 is an example of a path that passes through the center of target region 100. In the example shown in FIG. 8, the point of origin of path 1002A is point 1003A that is located at a position inward (upward in FIG. 8) from the intersection of the perpendicular bisector of the straight line connecting transmission antenna 61 and reception antenna 62 with side 1004 by a predetermined distance (for example, by 0.5 m) in target region 100. Likewise, the end point of path 1002A is point 1003B that is located at a position inward (downward in FIG. 8) from the intersection of the side that is opposite to side 1004 with the perpendicular bisector by a predetermined distance (for example, by 0.5 m). That is, as shown in FIG. 8, path 1002A is a path that passes through the center of target region 100, with point 1003A being set as the point of origin and point 1003B being set as the end point.

Next, estimation device 10 causes position estimator 60 to estimate a plurality of positions of living body 200 that moves along path 1002A (S32). More specifically, position estimator 60 estimates, by using the initially input first information and second information, the positions of living body 200 in target region 100 when, for example, living body 200 is present at point 1003A and point 1003B shown in FIG. 8, and transmits the result of estimation to processor 20.

Next, estimation device 10 acquires third information relating to the trajectory defined by the plurality of positions estimated in step S32 (S33). Estimation device 10 may acquire the plurality of positions estimated in step S32 as the third information. For example, as shown in FIG. 8, processor 20 may acquire, for example, the positions of living body 200 at point 1003A and point 1003B, as the third information.

Next, in step S4, estimation device 10 first calculates angle 1005A and angle 1005B shown in FIG. 8 by using the acquired third information (S41).

More specifically, processor 20 calculates angle 1005A by using the acquired third information, angle 1005A being the angle formed by the straight line connecting reception antenna 62 and point 1003A (or in other words, the position of living body 200 at point 1003A) and side 1004. Also, processor 20 calculates angle 1005B by using the acquired third information, angle 1005B being the angle formed by the straight line connecting reception antenna 62 and point 1003B (or in other words, the position of living body 200 at point 1003B) and side 1004.

Next, estimation device 10 calculates the length of side 1004 by using angle 1005A and angle 1005 calculated in step S41 (S42). More specifically, processor 20 calculates the length of side 1004 by using angle 1005A calculated in step S41 and the distance between side 1004 and point 1003A. Also, processor 20 calculates the length of side 1004 by using angle 1005B calculated in step S41 and the distance between side 1004 and point 1003B. The length of side 1004 calculated here corresponds to the horizontal length of target region 100 that is highly accurate and should be included in the first information. More specifically, processor 20 calculates the length of side 1004 by using Equation 1 given below.

[Math. 1]

$$a = \frac{b}{\tan \theta} \times 2 \quad \text{(Equation 1)}$$

In Equation 1, a indicates the length of side 1004 that needs to be obtained as a result of calculation. b indicates the distance between point 1003A and side 1004, or the distance between point 1003B and side 1004. θ indicates angle 1005A or angle 1005B.

Next, estimation device 10 estimates the installation state of transmission antenna 61 and reception antenna 62 by correcting the second information or the first information by using the length of side 1004 calculated in step S42 (S43). More specifically, processor 20 calculates the average length of the plurality of lengths of side 1004 calculated in step S42, and obtains a more accurate length of side 1004. Then, processor 20 corrects, by using the more accurate length of side 1004, the horizontal length of rectangular shape 1001 that is included in the first information and was initially input as the horizontal length of target region 100. Processor 20 may correct the horizontal length of rectangular shape 1001 that is included in the first information and was initially input as the horizontal length of target region 100 by replacing it with the length of side 1004 indicating the horizontal length of target region 100.

In the specific implementation given above, an example has been described in which the correction is performed by using the results of measurement performed at two points on the perpendicular bisector of side 1004, but the results of measurement performed at three or more points may be used to perform the correction. By using the results of measurement performed at three or more points, it is possible to correct the horizontal length of rectangular shape 1001 to a more accurate horizontal length of target region 100.

FIG. 9A is a schematic diagram showing another example of a path instructed in step S3 shown in FIG. 5 and a result of calculation performed in step S4. FIG. 9B is a schematic diagram showing another example of a path instructed in step S3 shown in FIG. 5. In FIGS. 9A and 9B, structural elements that are the same or similar to those shown in FIGS. 2 and 8 are given the same reference numerals, and a detailed description thereof will be omitted.

That is, the path that passes through the center of target region 100 is not limited to path 1002A shown in FIG. 8. The path that passes through the center of target region 100 may be path 1002B that is parallel to side 1004 shown in FIG. 9A, or may be path 1002C shown in FIG. 9B that is a path obtained by combining path 1002A shown in FIG. 8 and path 1002B shown in FIG. 9A.

Even when path 1002B shown in FIG. 9A is used as the path that passes through the center of target region 100, the length can be calculated by using Equation 1 in the same manner as in the case where path 1002A is used.

In this case, in Equation 1, b indicates the distance between point 1003C and side 1004, or the distance between point 1003D and side 1004. θ indicates angle 1005C or angle 1005D. Angle 1005C is formed by the straight line connecting point 1003C and reception antenna 62 and side 1004, point 1003C being the point of origin of path 1002B. Angle 1005D is formed by the straight line connecting point 1003D and reception antenna 62 and side 1004, point 1003D being the end point of path 1002B.

Figure 10:
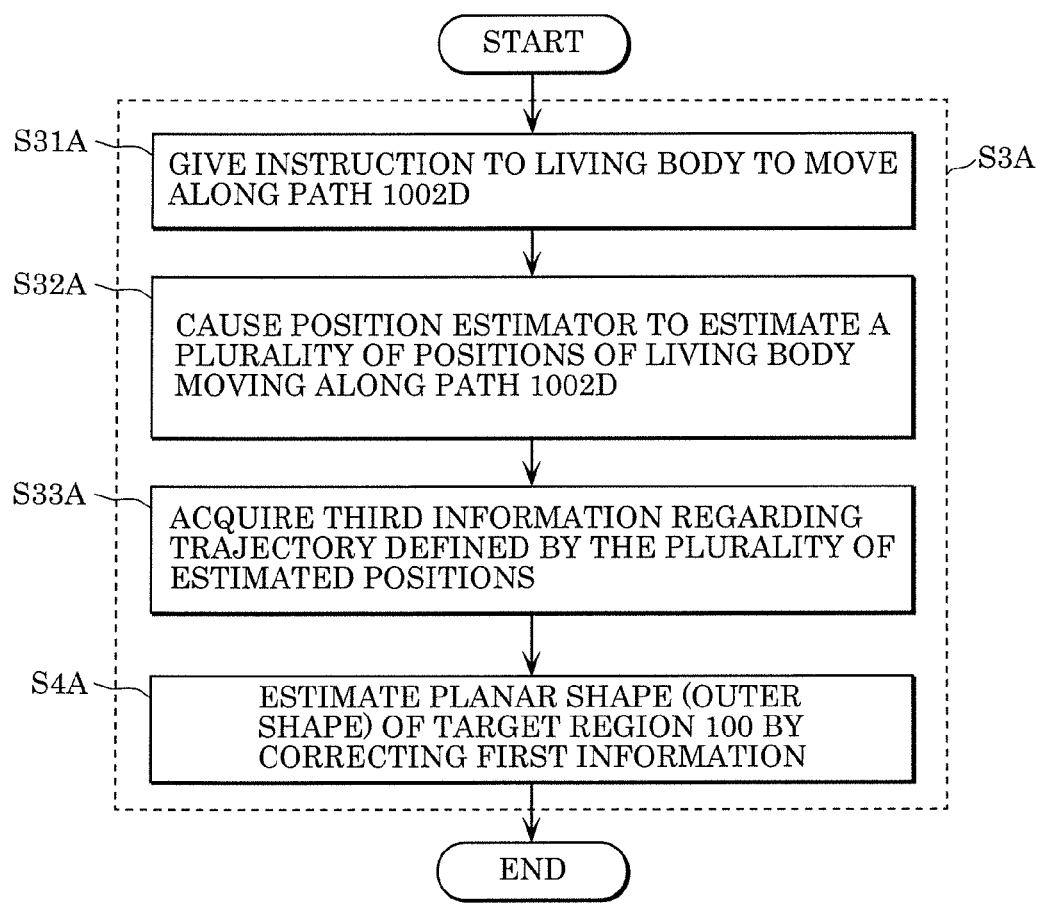
FIG. 10 is a flowchart illustrating another specific implementation of steps S3 and S4 shown in FIG. 4.

The specific implementation of steps S3 and S4 shown in FIG. 4 is not limited to that shown in FIGS. 7 to 9B, and steps S3 and S4 may be performed in the manner as shown in FIG. 10. Hereinafter, another specific implementation of steps S3 and S4 shown in FIG. 4 will be described with reference to FIG. 10.

Figure 11:
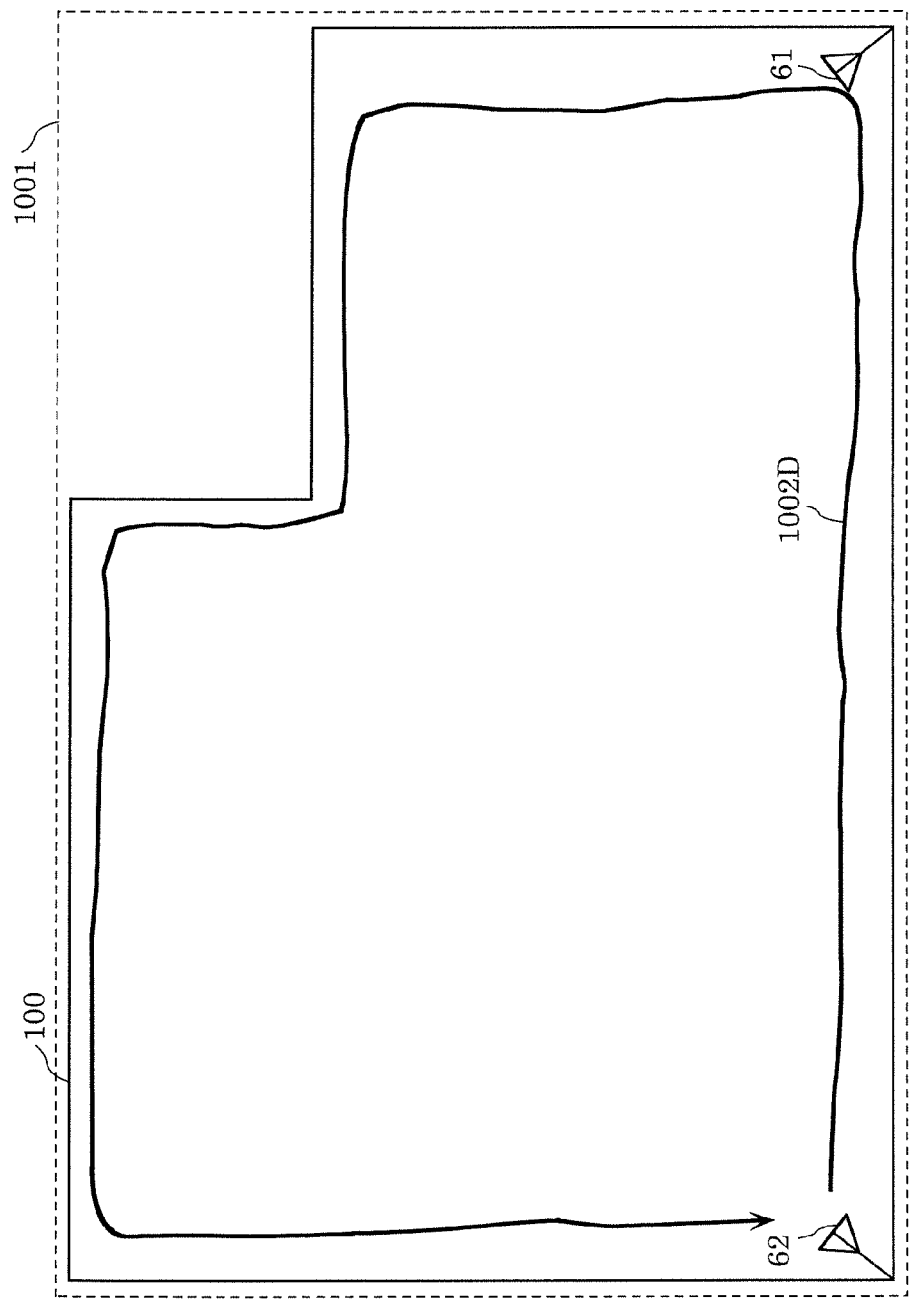
FIG. 11 is a schematic diagram showing an example of a path instructed in step S3A shown in FIG. 10.

FIG. 10 is a flowchart illustrating another specific implementation of steps S3 and S4 shown in FIG. 4. FIG. 11 is a schematic diagram showing an example of a path instructed in step S3A shown in FIG. 10. In FIG. 11, structural elements that are the same or similar to those shown in FIG. 2 are given the same reference numerals, and a detailed description thereof will be omitted.

In step S3A, first, estimation device 10 gives an instruction to the user to move along path 1002D shown in FIG. 11 that is a predetermined path in target region 100 (S31A). More specifically, processor 20 generates information that instructs the user to move along path 1002D shown in FIG. 11, and transmits the generated information to outputter 40. By doing so, outputter 40 can instruct living body 200 that is the user to move along path 1002D shown in FIG. 11.

Here, path 1002D shown in FIG. 11 is an example of a path extending along the outer circumference of target region 100 in which living body 200 can move.

Next, estimation device 10 causes position estimator 60 to estimate a plurality of positions of living body 200 that moves along path 1002D (S32A). More specifically, position estimator 60 estimates, by using the first information and the second information, a plurality of positions of living body 200 in target region 100 during a period in which living body 200 is moving along path 1002D shown in FIG. 11 that is the outer circumference of target region 100, and transmits the plurality of positions of living body 200 in chronological order to processor 20. The first information and the second information used by position estimator 60 are the first information and the second information that were initially input or corrected in step S43.

Next, estimation device 10 acquires the third information relating to the trajectory defined by the plurality of positions estimated in step S32A (S33A). Estimation device 10 may acquire the plurality of positions estimated in chronological order in step S32A as the third information.

Next, in step S4A, estimation device 10 first estimates the planar shape (outer shape) of target region 100 by correcting the first information based on the acquired third information. More specifically, processor 20 estimates a motion trajectory when living body 200 moves along path 1002D estimated by position estimator 60, as the outer shape of target region 100. Processor 20 estimates the outer shape of target region 100 by correcting the lengths of the planar shape of target region 100 included in the first information by using the estimated length of the motion trajectory.

In the embodiment given above, an example has been described in which target region 100 is composed of a single room, but the present disclosure is not limited thereto. Target region 100 may be composed of two or more adjacent rooms with a door(s) through which living body 200 can access the rooms.

Also, in the embodiment given above, an example has been described in which the target region information of target region 100 indicates the planar shape of target region 100 such as the outer shape of target region 100, or an installation state of transmission antenna 61 and reception antenna 62 such as the installation positions of transmission antenna 61 and reception antenna 62, but the present disclosure is not limited thereto. The target region information of target region 100 may further include the position of the fixture in target region 100, or may include information such as the position of specific region 110, such as a toilet, in target region 100. Also, the target region information of target region 100 may further include the azimuth of target region 100.

(Variation 1)

In this variation, overall processing performed by estimation device 10 when registering information such as the position of the fixture or specific region 110 in target region 100 and a specific implementation of the processing will be described.

Figure 12A:
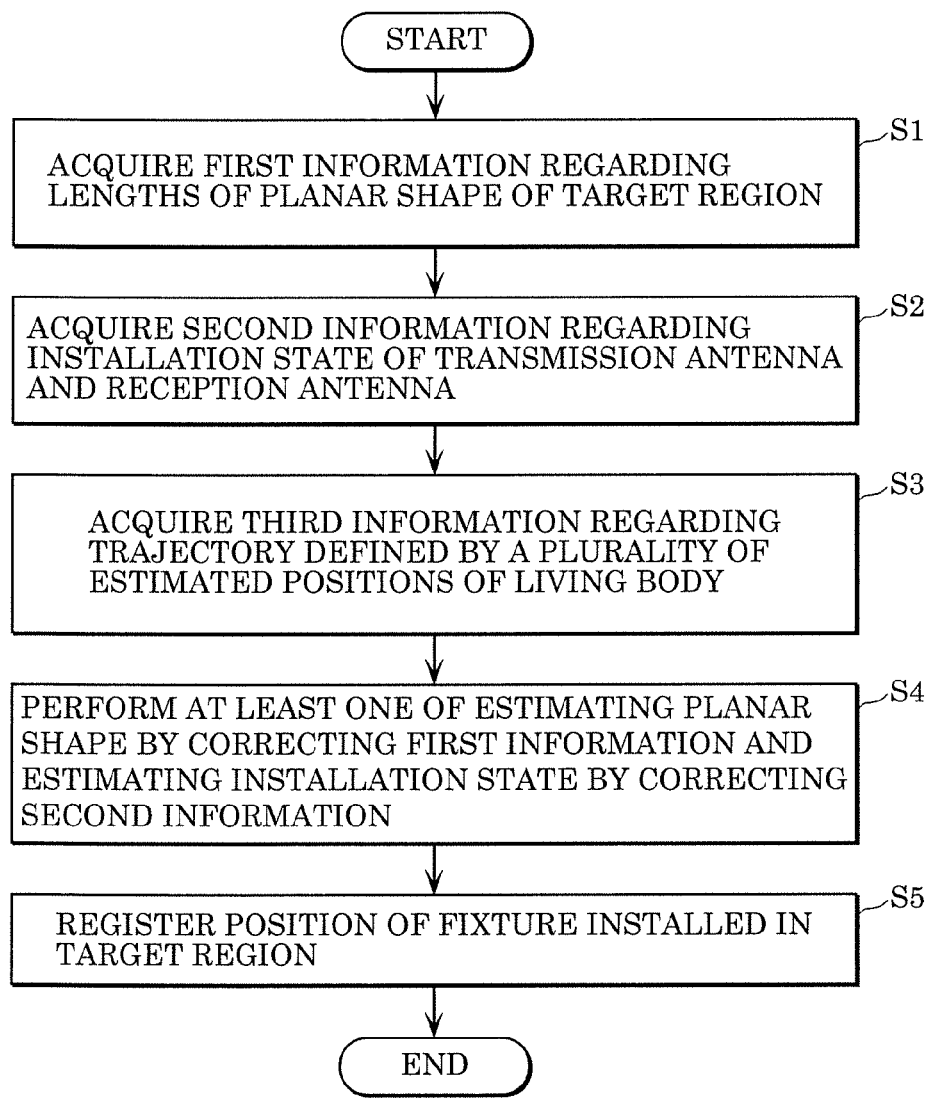
FIG. 12A is a flowchart illustrating overall processing performed by an estimation device according to Variation 1 of Embodiment 1.

FIG. 12A is a flowchart illustrating overall processing performed by estimation device 10 according to Variation 1 of Embodiment 1. In FIG. 12A, structural elements that are the same or similar to those shown in FIG. 4 are given the same reference numerals, and a detailed description thereof will be omitted.

The flowchart illustrating the overall processing performed by estimation device 10 according to Variation 1 shown in FIG. 12A is different from the flowchart illustrating the overall processing performed by estimation device 10 shown in FIG. 4 in that the processing of step S5 has been added.

That is, in this variation, furthermore, in step S5, estimation device 10 registers the position of the fixture installed in target region 100. In step S5, estimation device 10 may register the position of specific region 110 in target region 100.

Hereinafter, a specific implementation of step S5 shown in FIG. 12A will be described.

Figure 12B:
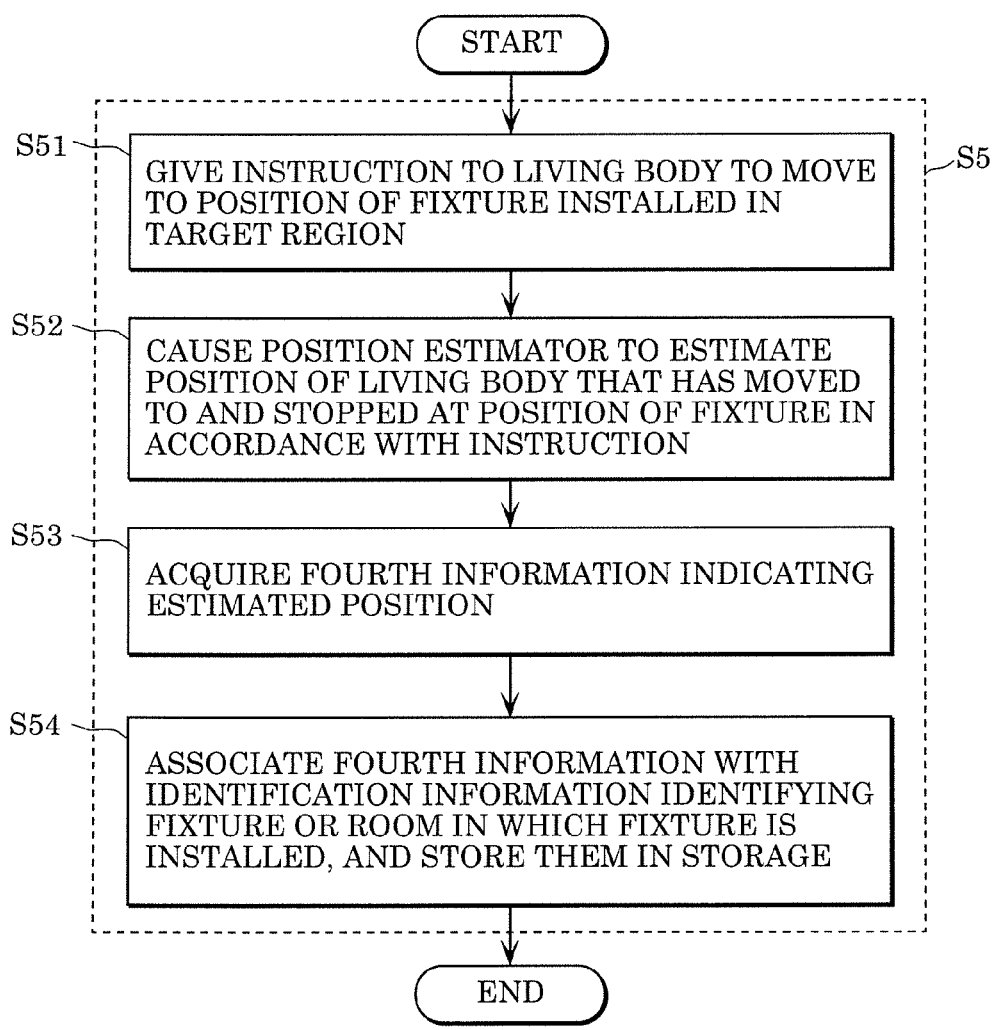
FIG. 12B is a flowchart illustrating a specific implementation of step S5 shown in FIG. 12A.

FIG. 12B is a flowchart illustrating the specific implementation of step S5 shown in FIG. 12A.

In step S5, first, estimation device 10 gives an instruction to living body 200 that is the user to move to the position of the fixture installed in target region 100 (S51). More specifically, processor 20 generates information that instructs the user to move to the position of the fixture that needs to be set or registered, and transmits the generated information to outputter 40. By doing so, outputter 40 can instruct living body 200 that is the user to move toward the fixture.

Next, estimation device 10 causes position estimator 60 to estimate the position of living body 200 that has moved to and stopped at the fixture in accordance with the instruction (S52). More specifically, position estimator 60 estimates the position of living body 200 at the time when living body 200 stopped, and transmits the estimated position to processor 20. Position estimator 60 may perform estimation such that a position at which living body 200 does not move for a predetermined length of time after receiving an instruction to move is determined as the position of living body 200. Alternatively, position estimator 60 may estimate the position of living body 200 based on the time input to inputter 30 by living body 200 when living body 200 has moved to the fixture.

Next, estimation device 10 acquires the fourth information that indicates the position estimated in step S52 (S53).

Next, estimation device 10 associates the fourth information acquired in step S53 with identification information identifying the fixture or a room in which the fixture is installed, and stores them in storage 50 (S54).

In this way, estimation device 10 registers the position of the fixture installed in target region 100.

(Variation 2)

In this variation, an example will be described in which estimation device 10 registers the position of specific region 110 in target region 100 composed of two adjacent indoor rooms with a door through which living body 200 can access the rooms, with reference to FIG. 13.

Figure 13:
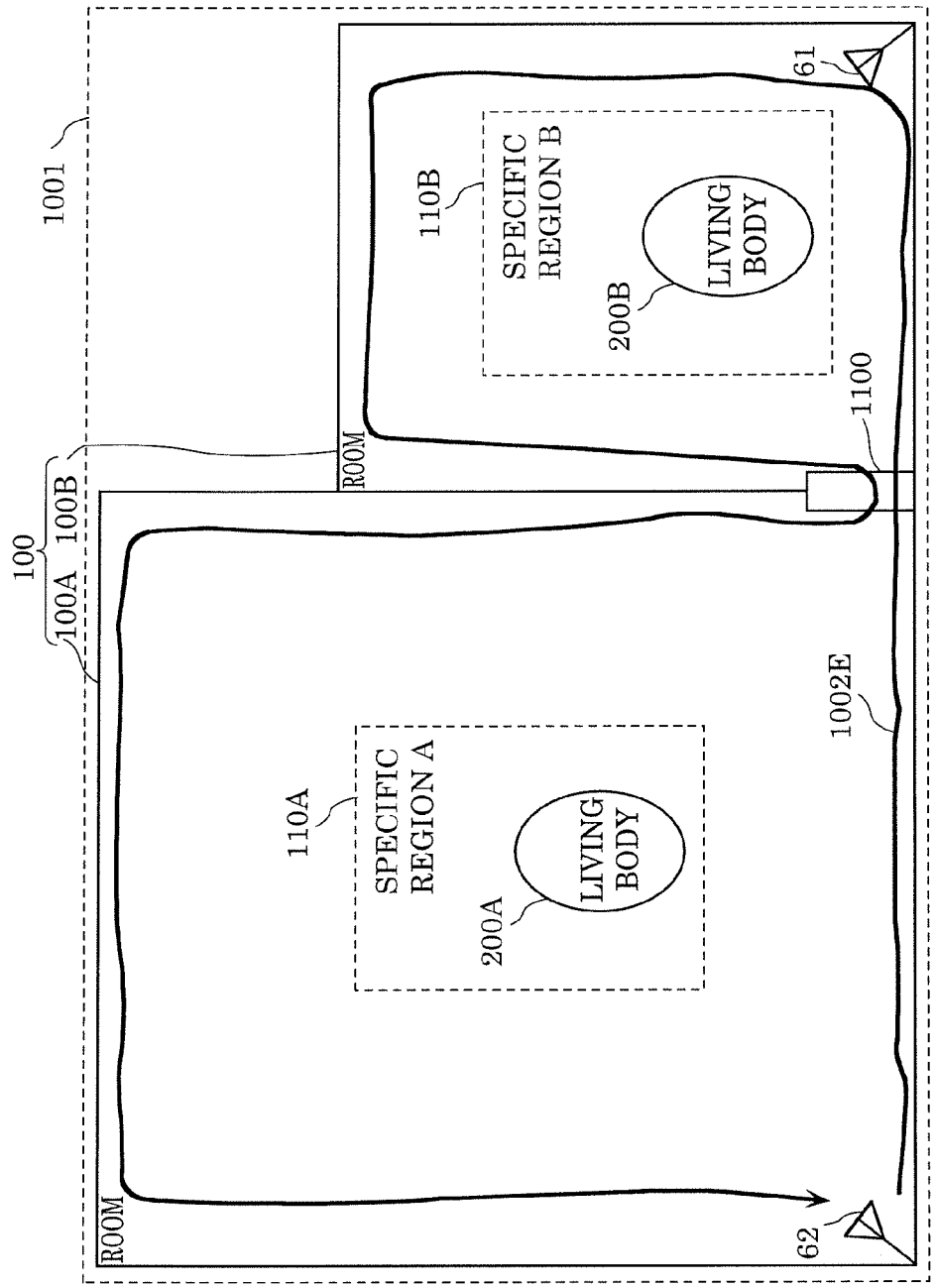
FIG. 13 is a schematic diagram showing an example of a target region, a predetermined path, and specific regions according to Variation 2 of Embodiment 1.

FIG. 13 is a schematic diagram showing an example of target region 100, a predetermined path, and specific regions according to Variation 2 of Embodiment 1.

Unlike target region 100 shown in FIG. 2 and the like that is composed of a single room, target region 100 according to Variation 2 shown in FIG. 13 is composed of two rooms, namely, room 100A and room 100B, with door 1100 through which living body 200 can access room 100A and room 100B. Also, in target region 100 according to Variation 2 shown in FIG. 13, transmission antenna 61 and reception antenna 62 of position estimator 60 are provided in target region 100 so as to straddle room 100A and room 100B.

Path 1002E according to Variation 2 shown in FIG. 13 is an example of a path extending along the outer circumference of target region 100 in which living body 200 can move, and path 1002E is different from, for example, path 1002D shown in FIG. 11 in that path 1002E passes through door 1100 and extends along the outer circumferences of room 100A and room 100B.

Then, when living body 200 moves along path 1002E in target region 100 shown in FIG. 13, a trajectory along which living body 200 moves along path 1002E is estimated, the outer shape of target region 100 that includes room 100A and room 100B is determined.

Also, in target region 100 according to Variation 2 shown in FIG. 13, the position of specific region 110A in room 100A and the position of specific region 110B in room 100B may be registered.

In this case, first, estimation device 10 according to Variation 2 gives an instruction to living body 200 to move to the position of specific region 110A in room 100A or the position of specific region 110B in room 100B. Next, estimation device 10 causes position estimator 60 to estimate the position of living body 200 that has moved to and stopped at the position of specific region 110A or specific region 110B in accordance with the instruction. Then, estimation device 10 associates the fourth information that indicates the position estimated by position estimator 60 with identification information identifying specific region 110A or specific region 110B, and stores them in storage 50.

In order to set an attribute such as, for example, usage, living body 200 may be instructed to move to room 100A or room 100B that has an attribute that needs to be set. In this case, estimation device 10 may estimate the position of living body 200A present in specific region 110A in room 100A or the position of living body 200B present in specific region 110B in room 100B. Then, estimation device 10 may store a peripheral region including the estimated position as specific region 110A or 110B that has an attribute that needs to be set.

Target region 100 whose outer shape is estimated is not necessarily composed of one or more indoor rooms as described above, and may be a compartment such as a toilet compartment, a region surrounding furniture such as a bed or a table, or the like. Also, the interior space boundary of, for example, a kitchen, a corridor, an entrance, or a bathroom may be estimated as the outer shape of target region 100.

Also, the height of living body 200 may also be estimated and stored in storage 50 when the position of the specific region or the position of the fixture is registered. By doing so, estimation device 10 can estimate the height of the specific region such as, for example, a bed or the floor.

[Effects, etc.]

As described above, with estimation device 10 and the like according to the present disclosure, the target region information of target region 100 can be estimated with ease and with high accuracy by using a wireless signal. More specifically, with the use of a wireless signal, for example, the planar shape such as the outer shape of the target region or the installation state such as the installation positions of transmission antenna 61 and reception antenna 62 can be estimated with ease and with high accuracy as the target region information of target region 100 in which the living body is to be sensed.

Furthermore, with the use of estimation device 10 according to Embodiment 1, the outer shape of target region 100 can be estimated with ease and with high accuracy simply as a result of living body 200 moving along a predetermined path. Accordingly, a room layout that is necessary to perform indoor monitoring by using a wireless signal of a microwave radar or the like can be estimated without performing troublesome manual input.

The estimation method, the estimation device, and the recording medium according to one aspect of the present disclosure have been described above by way of the embodiment, but the present disclosure is not limited to the embodiment given above. The present disclosure also encompasses other embodiments obtained by making various modifications that can be conceived by a person having ordinary skill in the art to the above embodiment as well as embodiments implemented by any combination of the structural elements of different embodiments without departing from the scope of the present disclosure.

Also, the present disclosure can be implemented not only as a sensor that includes characteristic structural elements as described above, but also as an estimation method that includes steps performed by the characteristic structural elements of the sensor, or the like. Also, the present disclosure can also be implemented as a computer program that causes a computer to execute the characteristic steps included in the method. Such a computer program may of course be distributed via a non-transitory computer-readable recording medium such as a CD-ROM, or a communication network such as the Internet.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to an estimation method, an estimation device, and a recording medium with which the direction and position of a living body is estimated by using a wireless signal. In particular, the present disclosure is applicable to an initialization method installed in a measuring device that measures the direction and position of a moving body including a living body and a machine, a household appliance that performs control according to the direction and position of the moving body, a monitoring device that detects the intrusion of the moving body, or the like.

What is claimed is:

1. An estimation method for estimating target region information relating to a target region by using an estimation device, the estimation method comprising:
    transmitting, a radio wave by a transmission antenna of the estimation device, towards the target region including a living body;
    receiving, a modified radio wave that is reflected by the living body and by a reception antenna of the estimation device;
    estimating a position of the living body based on the modified radio wave reflected by the living body;
    acquiring first information relating to lengths of a planar shape of the target region;
    acquiring second information relating to an installation state of the transmission antenna and the reception antenna included in the estimation device;
    acquiring third information relating to a trajectory defined by a plurality of positions of the living body estimated by the estimation device when the living body moves along a predetermined path in the target region; and
    performing estimation of the installation state by correcting the second information based on the first information, the second information, and the third information that were acquired, as the estimation of the target region information.

2. The estimation method according to claim 1,
    wherein the predetermined path is a path that passes through a center of the target region and along which the living body moves in the target region, and
    when performing the estimation of the installation state, the estimation of the installation state including installation positions of the transmission antenna and the reception antenna is performed by correcting the second information based on the first information, the second information, and the third information that were acquired, as the estimation of the target region information.

3. The estimation method according to claim 1,
    wherein the predetermined path is a path extending along an outer circumference of the target region in which the living body is capable of moving, and
    wherein the estimation method further comprises performing estimation of the planar shape by correcting the first information based on the first information, the second information, and the third information that were acquired, as the estimation of the target region information.

4. The estimation method according to claim 1,
    wherein the installation state includes at least one of installation positions, installation heights, and installation angles of the transmission antenna and the reception antenna.

5. The estimation method according to claim 1,
    wherein the target region includes one or more indoor rooms, and
    the estimation method further comprises:
        acquiring fourth information indicating the position of the living body estimated by the estimation device when the living body stops at a position of a fixture installed in the target region; and
        associating the fourth information with identification information identifying the fixture or a room in which the fixture is installed from among the one or more indoor rooms, and storing the fourth information and the identification information in a storage.

6. The estimation method according to claim 5, further comprising:
    displaying the fourth information on a display device as information indicating the position of the fixture or a position of the room in which the fixture is installed;
    receiving correction information for correcting the position of the fixture or the position of the room input by a user; and
    correcting the fourth information based on the correction information received.

7. The estimation method according to claim 1, further comprising:
    acquiring the position of the living body estimated by the estimation device when the living body stops at a position in a direction toward a predetermined azimuth as viewed from a center of the target region;
    associating a direction from the center toward the position of the living body acquired with the predetermined azimuth; and storing the direction and the predetermined azimuth in a storage as an azimuth of the target region.

8. The estimation method according to claim 1,
wherein the estimation device estimates the position of the living body based on signal components affected by the living body, the signal components being extracted from among signals received by the reception antenna by using a predetermined method.

9. An estimation device that estimates target region information relating to a target region, the estimation device comprising:
a transmission antenna that transmits a radio wave towards the target region including a living body;
a reception antenna that receives a modified radio wave that is reflected by the living body;
a position estimator that estimates a position of the living body based on the modified radio wave reflected by the living body;
an acquirer that acquires first information relating to lengths of a planar shape of the target region, acquires second information relating to an installation state of the transmission antenna and the reception antenna, and acquires third information relating to a trajectory defined by a plurality of positions of the living body estimated by the position estimator when the living body moves along a predetermined path in the target region; and
a correction estimator that performs estimation of the installation state by correcting the second information based on the first information, the second information, and the third information that were acquired, as the estimation of the target region information.

10. A non-transitory computer-readable recording medium having a program recorded thereon for causing a computer to execute an estimation method for estimating target region information relating to a target region by using an estimation device, the estimation method comprising:
transmitting, a radio wave by a transmission antenna of the estimation device, towards the target region including a living body;
receiving, a modified radio wave that is reflected by the living body and by a reception antenna of the estimation device;
estimating a position of the living body based on the modified radio wave reflected by the living body;
acquiring first information relating to lengths of a planar shape of the target region;
acquiring second information relating to an installation state of the transmission antenna and the reception antenna included in the estimation device;
acquiring third information relating to a trajectory defined by a plurality of positions of the living body estimated by the estimation device when the living body moves along a predetermined path in the target region; and
performing estimation of the installation state by correcting the second information based on the first information, the second information, and the third information that were acquired, as the estimation of the target region information.

* * * * *